A. BOYNTON.
PNEUMATIC TRIGGER PULL FOR FIREARMS.
APPLICATION FILED JULY 16, 1918.

1,297,535.

Patented Mar. 18, 1919.

WITNESSES
J. T. Schrott

INVENTOR
Alexander Boynton.
BY
ATTORNEYS

A. BOYNTON.
PNEUMATIC TRIGGER PULL FOR FIREARMS.
APPLICATION FILED JULY 16, 1918.

1,297,535. Patented Mar. 18, 1919.
7 SHEETS—SHEET 5.

WITNESSES
INVENTOR
Alexander Boynton
BY
ATTORNEYS

A. BOYNTON.
PNEUMATIC TRIGGER PULL FOR FIREARMS.
APPLICATION FILED JULY 16, 1918.

1,297,535.

Patented Mar. 18, 1919.
7 SHEETS—SHEET 6.

WITNESSES
J. P. Schrott

INVENTOR
Alexander Boynton
BY
ATTORNEYS

UNITED STATES PATENT OFFICE.

ALEXANDER BOYNTON, OF THE UNITED STATES NATIONAL ARMY.

PNEUMATIC TRIGGER-PULL FOR FIREARMS.

1,297,535.        Specification of Letters Patent.        Patented Mar. 18, 1919.

Application filed July 16, 1918. Serial No. 245,189.

*To all whom it may concern:*

Be it known that I, ALEXANDER BOYNTON, a citizen of the United States, and a captain in the United States National Army, have invented certain new and useful Improvements in Pneumatic Trigger-Pulls for Firearms, of which the following is a specification.

My invention relates to improvements in firearms, pertaining to improvements in the trigger operating or projectile discharging mechanism, and it consists in the constructions, combinations and arrangements herein described and claimed.

An object of my invention is to provide a pneumatically actuated mechanism for operating the trigger or other projectile discharging apparatus of a firearm, which enables an internal application of the operating force, thus preserving the equilibrium of the firearm irrespective of how suddenly or vigorously the operating force is applied.

Another object of the invention is to provide a pneumatically actuated fire control mechanism by means of which a single operator is enabled to control an entire battery of machine guns or automatic rifles.

A further object of the invention is to provide a pneumatically actuated trigger operating mechanism which enables the controlling of a complete battery of machine guns from a distance and further enables the setting of machine gun traps by concealing one operator and as many machine guns in each battery as may be desirable.

A further object of the invention is to provide a pneumatically operated trigger actuating mechanism which liberates the right hand of the operator and enables more complete control and attention to the operation of the gun.

A further object of the invention is to provide a pneumatically actuated trigger operating mechanism for small arms of the type that are fired while held in the hand, which enables the firing of the firearm without disturbing the poise or causing the wabbling of the sight on and off the target by the muscular effort usually employed to pull the trigger.

A further object of the invention is to provide a pneumatically actuated trigger operating means for firearms which prevents the accidental discharging of the firearm.

Other objects and advantages will appear in the following specification, reference being had to the accompanying drawings in which.

In carrying out my invention I have arranged the mechanism to enable it to be operated on two general principles, namely, by suction which may be produced either by the mouth of an operator or by a vacuum pump, and air pressure which may be produced either by the mouth of an operator or a suitable air compression pump. In carrying out this arrangement, a definite object has been held in view. Those forms of the invention wherein the trigger is pulled by the suction actuated mechanism, are adapted more particularly to small arms that are fired when held in the hand and to machine guns, etc., when operated singly or in small groups.

Figures 1, 3, 4:
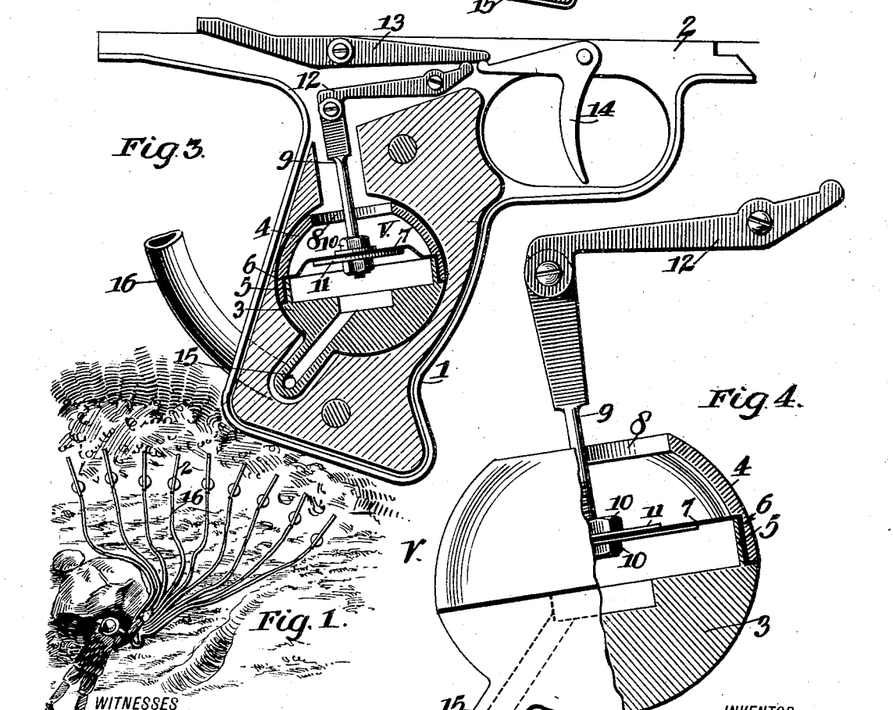
Figure 1 is a diagrammatic plan view showing how a battery of machine guns is controlled by a single concealed operator, the disposition of the rubber tubing, hollow wires or metal tubing being such as to enable the individual control of the guns.
Fig. 3 is an enlarged detail view of the grip of the same gun illustrating the embodiment of the invention.
Fig. 4 is a detail view of the diaphragm holding cup.

On the other hand, the air pressure actuated trigger operating mechanism is adapted more particularly for automatic rifles, machine guns, and all other kindred types of firearms that are intended to be operated in large batteries. The advantage of applying the air pressure actuating principle in such instances, and as illustrated in Fig. 1, will readily become apparent. Where long lines of rubber tubing are employed, some of the tubes are likely to kink or become mashed. Obviously by blowing into the tubes or by applying compressed air by some other means, the obstruction will become opened. Should it be attempted to operate the guns in such instances on the vacuum principle, obviously the suction in the tubes would tend to cause them to collapse still more and thus only aggravate the obstruction. For this reason, and the further reason that compressed air is mechanically more convenient to operate, the pressure actuated principle is employed where there are long and many lines of rubber tubing. The suction operated principle is employed where the tubing is short and not apt to kink, as in the class of small arms that are arranged to be fired while held in the hand. This latter principle is preferably employed in the connection just stated, because it is humanly more convenient, as well as more sanitary to apply the necessary force by suction than by compressed air.

Considering then the two general classes into which the invention is divided, attention is first directed to the first, second, third and fourth forms in which are illustrated

*The vacuum actuated principle.*

Figure 2:
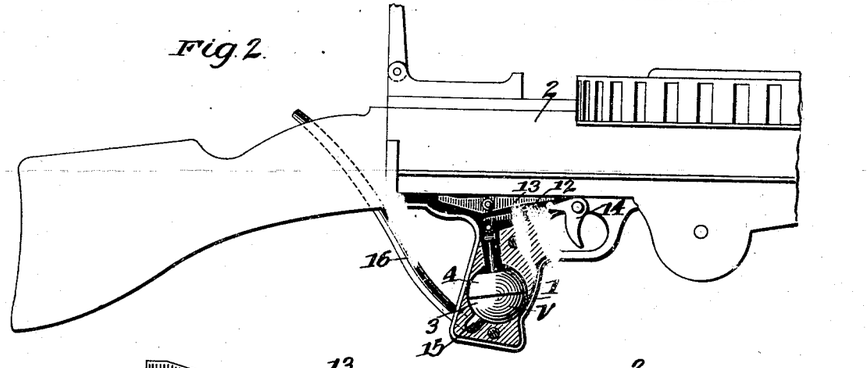
Fig. 2 is a detail view of a portion of a machine gun showing the first form of the invention applied.

The first form of the invention is shown embodied in Figs. 2 to 4, wherein it will be observed that the vacuum cup V is mounted in any suitable manner in the grip 1 of a machine gun 2. The vacuum cup consists of a base 3 and a top 4. The base 3 is practically solid and has an annular flange 5 spaced in a short distance from the periphery and adapted to occupy the corresponding annular recess 6 in the top 4 when the two parts are fitted and clamped together as illustrated in the drawings. A diaphragm 7 of some suitable flexible material is clamped between the flange 5 and the top 4 as clearly illustrated in Fig. 5. The diaphragm acts as a piston.

An opening 8 in the top 4 accommodates the stem 9 which at the lower end is fastened to the diaphragm or piston by means of the nuts 10 and clamp plates 11 on the opposite sides of the diaphragm. The upper end of the stem 9 is pivoted to one end of an actuating lever 12 which in turn is fulcrumed in such a position with respect to the sear 13 on the inside of the gun, that upon the collapse of the diaphram 7 the sear 13 is moved on its pivot and the machine gun 2 is caused to operate. The same result would follow upon depression of the trigger 14 which also engages the sear as in the usual manner.

A teat 15 made as an integral part with the solid base 3 and provided with a bore, extends off at an angle toward the bottom and out at one side of the grip 1. A suction air tube 16 is connected to the end of the teat. This air tube or hose may consist of a hollow wire or metal tube but will hereinafter be referred to as the hose 16. The hose 16 is provided with a mouth nipple which is adapted to be taken into the mouth of the operator and drawn upon so as to cause the collapse of the diaphragm 7 as just explained. Single shots of the machine gun 2 are obtained by drawing quickly upon the nipple so that the diaphragm 7 is caused to vibrate accordingly. The machine gun is made to fire continuously by drawing on the nipple and then pinching the tube together with the teeth or fingers so as to maintain the vacuum in the tube connection and the chamber beneath the diaphragm. The diaphragm is thus held in the collapsed position and the same result is thus obtained as it would be were the trigger 14 pressed upon steadily.

Figures 5, 6, 7, 18:
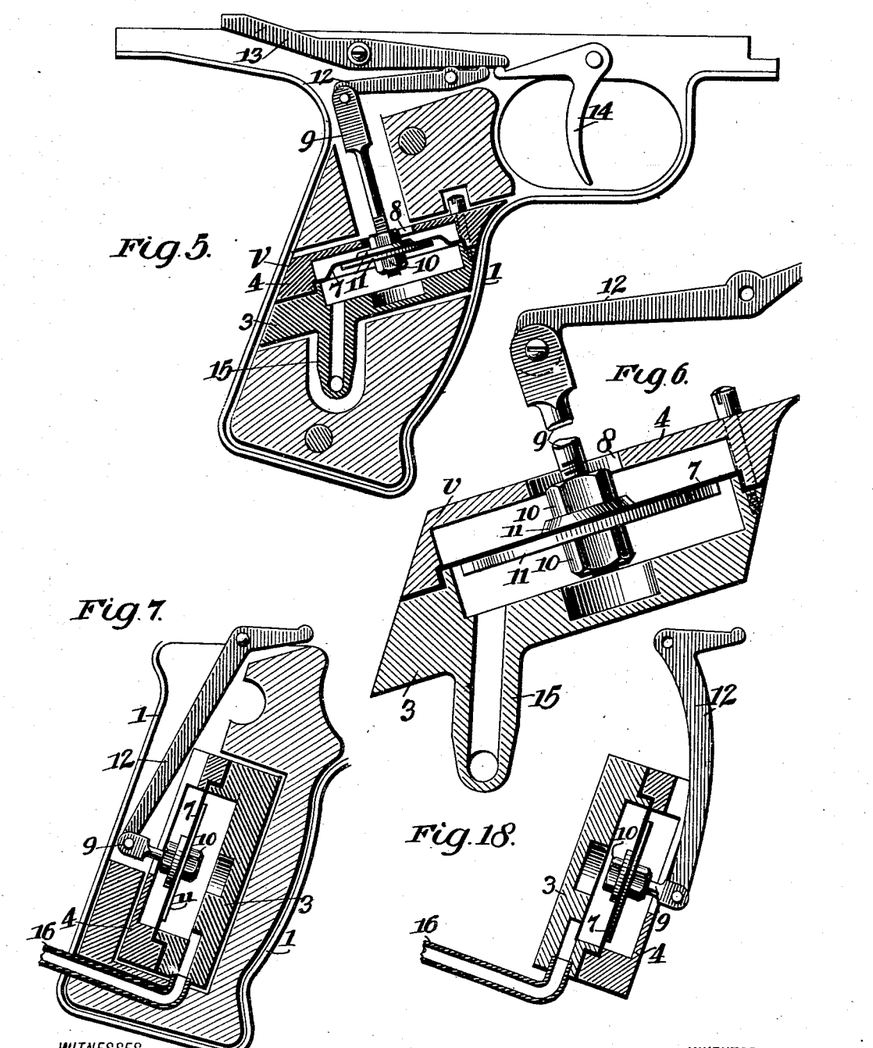
Fig. 5 is a sectional view of the grip of a machine gun on the same order as illustrated in Fig. 3, showing the embodiment of the second form of the invention.
Fig. 6 is an enlarged detail view of the diaphragm holding cup.
Fig. 7 is a slight modification of the arrangement illustrated in Fig. 6.
Fig. 18 is a sectional view showing the vacuum cup illustrated in Fig. 7 re-arranged to be operated by air pressure and to constitute the sixth form of the invention.

The second form of the invention illustrated in Figs. 5 to 7, merely differs in the shape of the vacuum cup V. In Figs. 5 and 6 it will be observed that the vacuum cup is disposed diagonally across the grip 1 with the elbowed teat 15 extending straight down and out. For purposes of manufacture and installation, this arrangement may be better than that illustrated in Figs. 2, 3 and 4, but otherwise the mechanism works the same. The modification illustrated in Fig. 7 simply consists in the reshaping of the vacuum cup V which in the present instance is intended to be cylindrical. Furthermore, the vacuum cup is disposed in a different position in the grip 1 and the stem 9 which is connected to the actuating lever 12, is much shorter. So far as described, the vacuum actuated principle of the invention is employed in machine guns. As stated before, this may readily be done where the machine guns are operated either singly or in small groups. Large groups or batteries of machine guns are not intended to be operated on this principle. It is intended primarily to use the vacuum actuated trigger operating mechanism in connection with small arms in the manner substantially as illustrated in the third form of the invention in Figs. 8 to 15.

Figure 8:
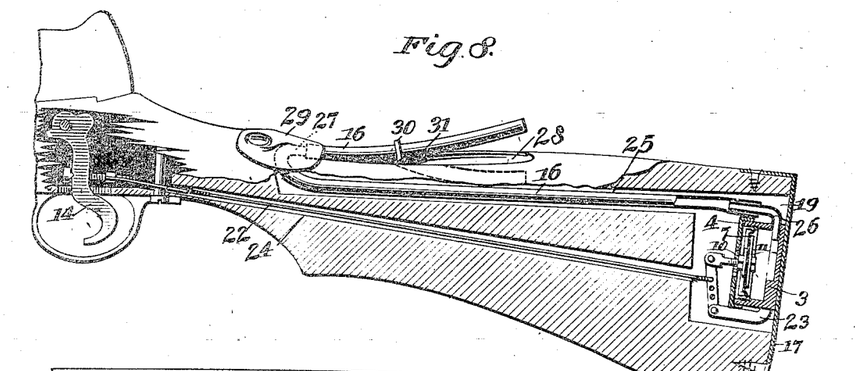
Fig. 8 is a detail sectional view of the stock of a small arm illustrating the embodiment of the third form of the invention.
Figures 9, 10, 11, 12:
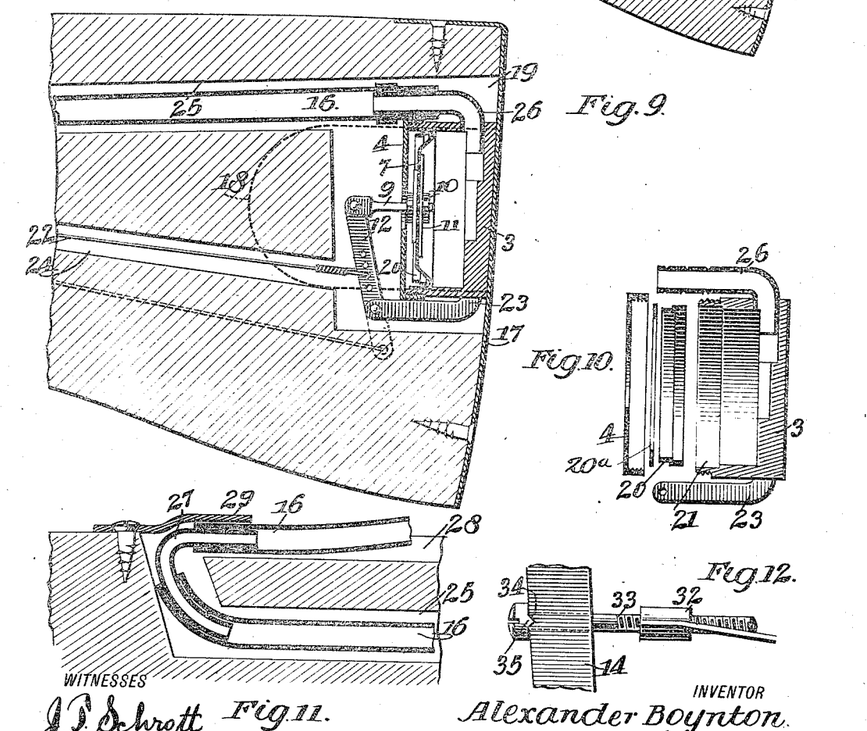
Fig. 9 is an enlarged detail view of the stock illustrated in Fig. 8.
Fig. 10 is a sectional view illustrating a part of the vacuum cup disassembled.
Fig. 11 is a detail sectional view showing how the air tube is clamped in place.
Fig. 12 is a detail view of the trigger pull adjustment link.

In Figs. 8 and 9 it will be observed that the vacuum cup V is mounted in an excavation under the butt plate 17 which includes the side flange 18 and is arranged to close the recess 19 in which the vacuum cup is situated. In this third form of the invention, the diaphragm 7 is held in place by a diaphragm clamp ring 20 which is formed as shown in Fig. 10.

The base 3 is provided with an annular recess 21 into which the clamp ring, together with the diaphragm, is pressed. The top 4 is then screwed down so that when the parts are assembled and the trigger pull adjusted they appear as illustrated in Fig. 9. Before screwing the top 4 down, a paraffin paper washer 20$^a$ is fitted on top of the diaphragm for the double purpose of preventing friction between the top and the diaphragm and to prevent the sticking together of the parts. The stem 9 which is clamped in place on the diaphragm by the nuts 10 and washers 11, is connected to the actuating lever 12 which in the present instance is provided with a plurality of holes so as to secure various leverages on the trigger 14 when the trigger wire 22 is connected therein. The actuating lever 12 it will be observed, is fulcrumed on a bracket 23 which extends forwardly from the base 3 of the vacuum cup.

Bores 24 and 25 accommodate the trigger wire 22 and the suction hose 16 respectively. An air line elbow 26 extends forwardly from the base of the vacuum cup V and is provided with a plurality of circular grooves near the end so that the fabric of the tube may sink therein and form a tighter connection. The front end of the suction hose 16 is connected to one end of an elbow 27, and the continuation of the hose at the other end of the elbow extends out of a groove 28 in the stock of the gun.

A clamp 29 holds the elbow and air hose in place. An elevating ring 30 is slipped over the air hose and is adjustable along the length of the air hose so that it may be elevated more or less according to the position of the ring on the hose. When the ring is moved nearer the clamp 29, the free end of the hose will be correspondingly higher so that it may more readily be reached by the operator of the gun. A nipple shield 31 consists simply of a bore in the gun stock into which the nipple end of the hose 16 may be slipped in order to protect it when it is desired that the nipple be not exposed.

The tension of the trigger wire 22 is maintained through the agency of an adjustment link 32 which includes the adjusting screw 33. A notch 34 in the front end of the trigger 14 receives a correspondingly shaped lug 35 on the head of the screw 33. The trigger wire 22 is connected to the link 32 as plainly shown in Fig. 8. It will be readily understood that the proper tension of the trigger wire is maintained through the medium of the screw 33 and the link 32.

The actuating lever 12 may if desired, be arranged with an extension below the bracket 23 so that instead of operating the device by suction as this form of the invention is intended to be operated, it may be operated by compressed air. To enable this to be properly done, slight changes in the position and arrangement of the diaphragm will be necessary.

Figures 13, 14, 15, 16, 17:
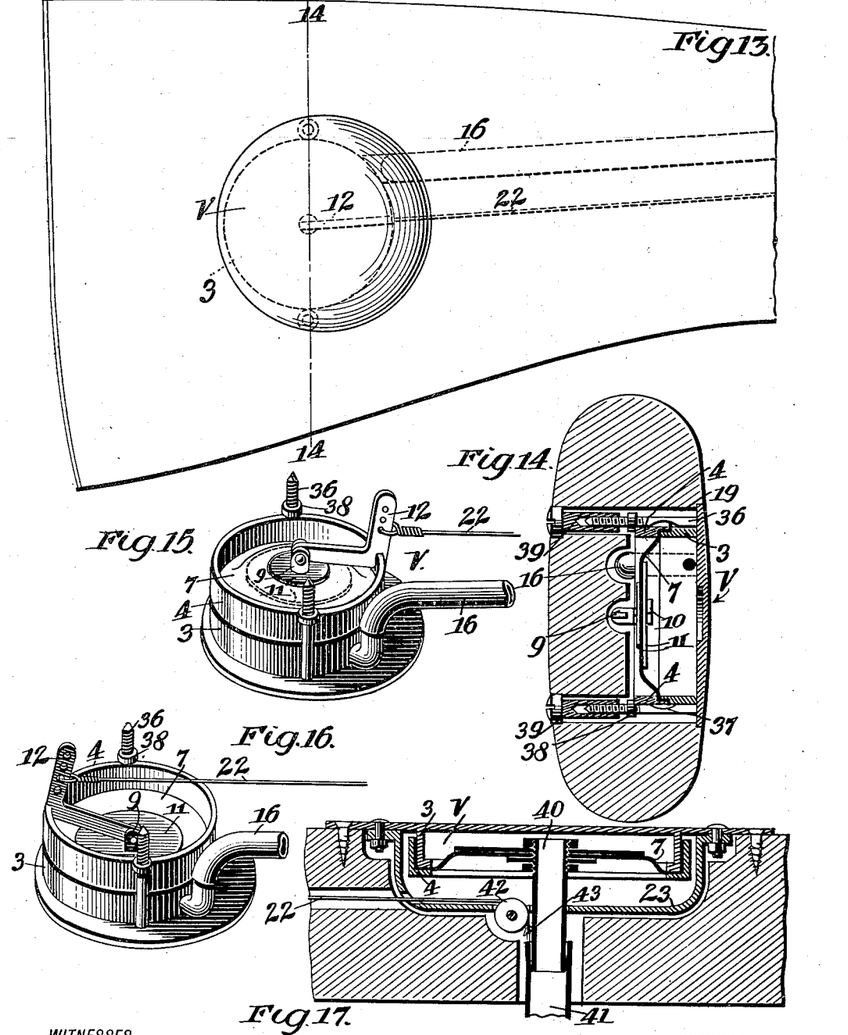
Fig. 13 is a detail side elevation of the stock of a small arm illustrating the arrangement of the fourth form of the invention.
Fig. 14 is a cross section on the line 14—14 of Fig. 13.
Fig. 15 is a perspective view of the vacuum cup embodied in the stock shown in Fig. 13.
Fig. 16 is a perspective view of the vacuum cup showing it arranged to be operated by air pressure and to constitute the fifth form of the invention.
Fig. 17 is a sectional view illustrating a modification wherein the mechanism is operated by air pressure.

In Figs. 13, 14 and 15, the fourth form of the invention operates in the same manner as the forms previously described, although the structure is somewhat different. The vacuum cup V occupies a recess 19 at the side of the gun stock. The diaphragm 7 is clamped in place between the base 3 and the top 4 by means of a pair of diaphragm clamp studs 36. The clamp studs 36 in the present instance are made integral with the base 3 and are formed with concave portions 37 in the regions adjacent to the separation between the base and the top, so as to accommodate any projecting portion of the diaphragm on the outside of the vacuum cup.

Nuts 38 screwed on the threaded portions of the clamp studs 36 engage the upper edge of the top 4 and hold the parts securely together. Stud fastening screws 39 introduced from the other side of the gun stock, screw on the studs 36 and clamp the vacuum cup in position in the recess 19.

The actuating lever 12 in the present instance, is in the form of a bell crank which is pivoted at the elbow on the top 4. The trigger wire 22 may be connected in any one of the series of holes in the upper part of the bell crank, while the other arm of the bell crank is pivoted to the stem 9 which is clamped to the diaphragm 7 similarly as in the other forms of the invention. Upon drawing lightly on the suction hose 16, the diaphragm 7 is made to collapse and rock the actuating lever 12 on its pivot so as to pull the wire 22 and consequently actuate the trigger similarly as is done in the form shown in Fig. 8.

*The air pressure principle.*

By reversing the position of the actuating lever 12 as is done in Fig. 16, the trigger wire 22 may be made to pull the trigger 14 upon blowing into the air tube 16 instead of drawing on it. In this fifth form of the invention, the diaphragm 7 and washers 11 are reversed in position as will readily be observed in Fig. 16. The remaining structure in Fig. 16 is identical with that in Fig. 15. In Fig. 17, the diaphragm 7 carries a short tube 40 over which the end 41 of the air tube 16 is connected. On blowing into the tube 40, the diaphragm 7 is distended, causing the trigger wire 22 to pull on the trigger. The tendency of the tube 40 to lean toward the trigger due to the tension of the trigger wire is arrested by the pulley.

In this form of the invention, the wire 22 runs over a pulley 42, which is mounted on a bracket 23 over the vacuum cup V. The end of the wire 22 is connected to the tube 40 by means of a small hook 43. In its other respects, the construction in Fig. 17 is substantially like that shown in some of the other forms of the invention.

The sixth form of the invention illustrated in Fig. 18 is arrived at by simply reversing the parts illustrated in Fig. 7. It will be observed that upon blowing into the hose 16, the diaphragm 7 will be distended so as to rock the actuating lever 12 on its pivot and move the sear 13 similarly as is done as in the case of Fig. 7 where the actuating lever 12 is operated when the diaphragm 7 is made to collapse by suction.

Figure 19:
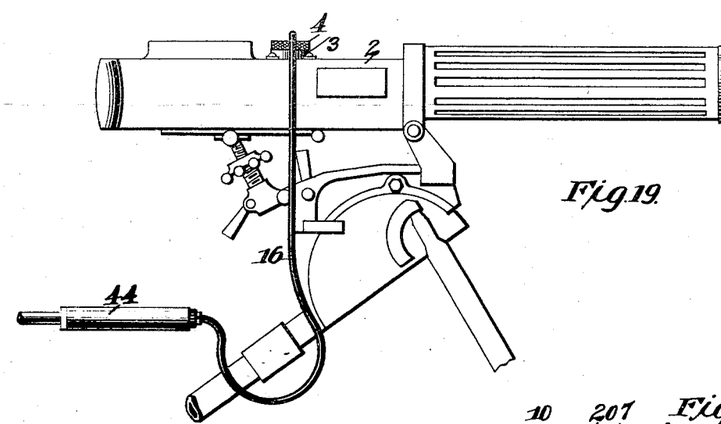
Fig. 19 is a side elevation of a Vickers machine gun illustrating the application of the seventh form of the invention which is simply a modification of the third form of the invention illustrated in Fig. 9, to enable the operation thereof by compressed air.
Figure 20:
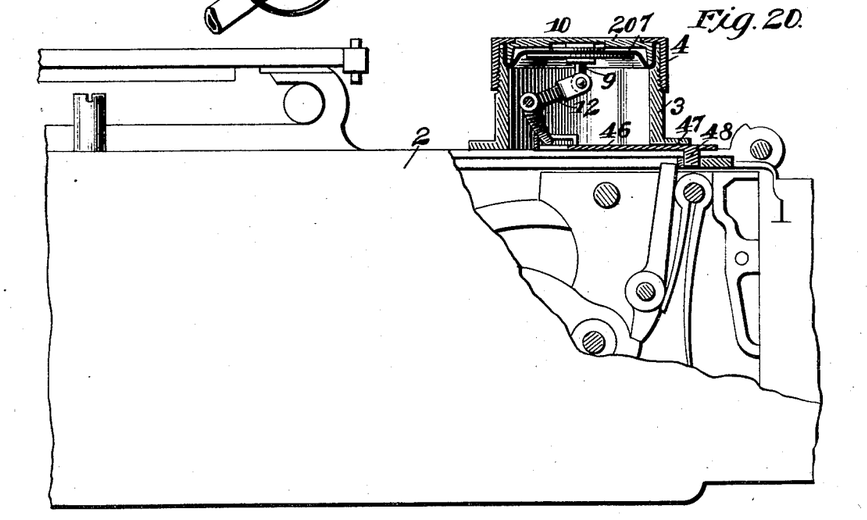
Fig. 20 is an enlarged detail sectional view of the parts shown in Fig. 19.
Figure 21:
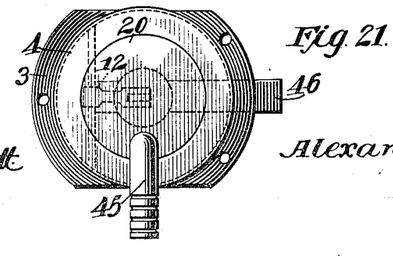
Fig. 21 is a plan view.

*The modification illustrated in Figs. 19, 20 and 21* constitutes the seventh form of the invention which is based in some respects on the third form of the invention illustrated in Fig. 9. This form of the invention operates by compressed air and for this purpose, a small air pump 44 is attached to one end of the hose 16 which leads to the hose connection 45. It will be observed by a comparison of the reference characters, that the parts of the seventh form of the invention are somewhat like the parts in Fig. 9.

The diaphragm or piston 7 is connected through the stem 9 to the actuating lever 12 which as shown in Fig. 20, is mounted on a fulcrum pin inside of the base 3. The hose connection 45 opens on top of the diaphragm and when the diaphragm is actuated by air pressure from the pump 44, it moves downwardly and rocks the actuating lever 12 on its fulcrum. The free arm of the actuating lever 12 works in the head of a trigger bar connection 46. This trigger bar connection extends forwardly and out of a slot 47 in the bottom edge of the base 3, where it is provided with a lug 48. This lug 48 is connected in any suitable manner with the operating mechanism of the machine gun as generally indicated in Fig. 20.

Figures 22, 23:
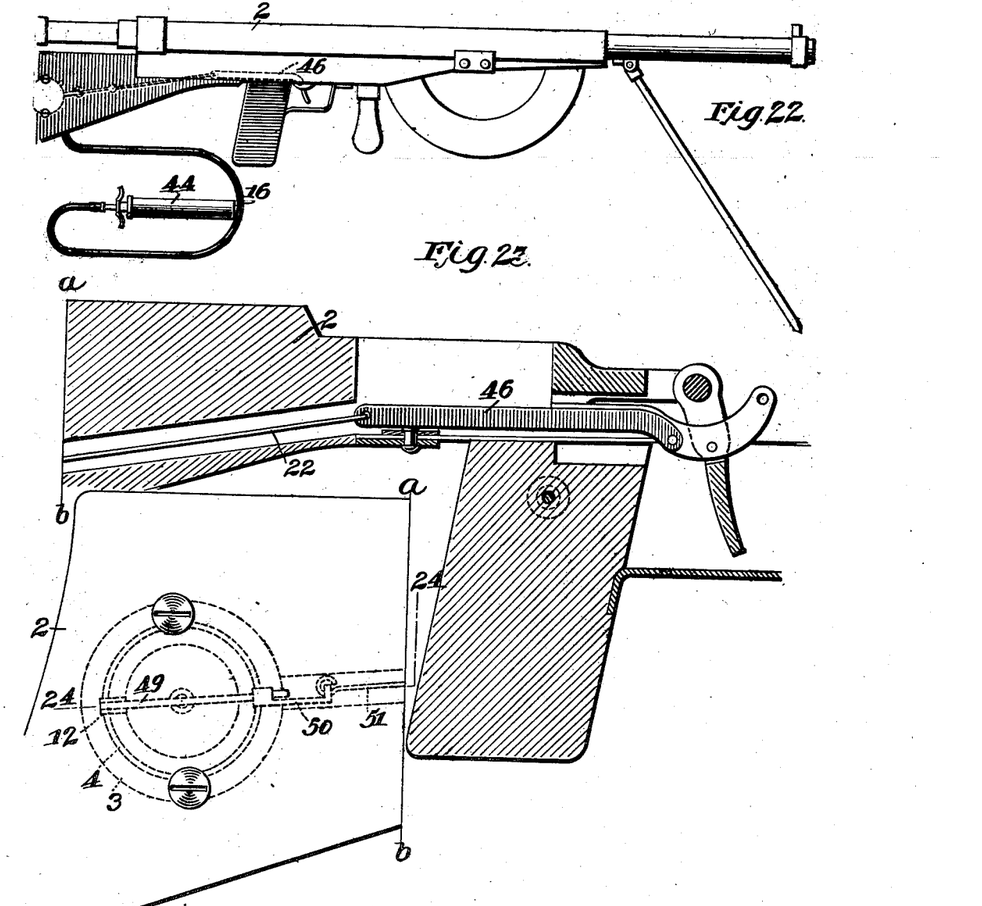
Fig. 22 is a side elevation of a Chauchat machine rifle illustrating the application of the eighth form of the invention which is a slight modification of the fourth form of the invention illustrated in Fig. 14 to adapt it for operation by compressed air.
Fig. 23 is a sectional view, the parts of the view being intended to be read together on the lines $a—b$.
Figure 24:
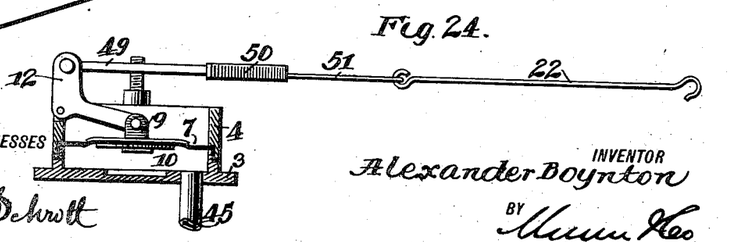
Fig. 24 is a longitudinal section on the line 24—24 of Fig. 23.

*The modification in Figs. 23 and 24* constitutes the eighth form of the invention and is somewhat like the fourth form of the invention illustrated in Fig. 14 in that the actuating lever 12 is fulcrumed at one side of the cup top 4 as indicated in Fig. 15. Instead of joining the trigger pull wire 22 to the free arm of the actuating lever 12 as is done in Fig. 14, a tension adjusting screw 49 is interposed between the free end of the lever and the pull wire 22. It will be observed in Fig. 24 that the tension adjusting screw includes the turn buckle 50, and a link 51 is interposed between the turn buckle and the wire 22. The hose 16 which in this instance is also connected to a pump 44, is joined to the hose connection 45 beneath the diaphragm or piston 7. The diaphragm 7 moves upwardly under the influence of air pressure applied beneath the diaphragm and the actuating lever 12 with its coöperating parts is operated as a consequence. The hook end of the trigger pull wire 22 is connected to the trigger bar connection 46. This trigger bar connection is equivalent to the trigger bar connection 46 in Fig. 20 and has the same function.

Figure 25:
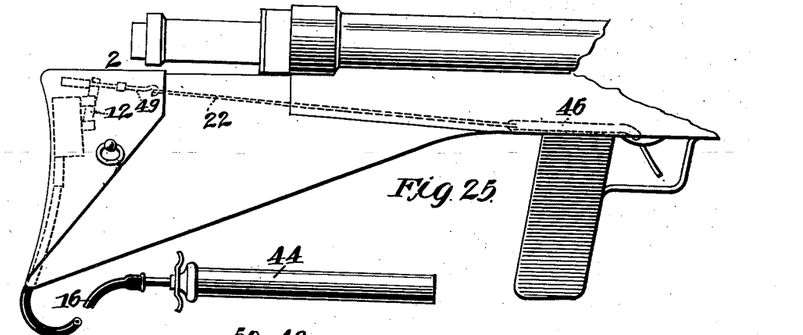
Fig. 25 is a detail side elevation illustrating the application of the ninth form of the invention to a Chauchat machine gun, this form of the invention being a further slight modification over the third form illustrated in Fig. 9.
Figures 26, 27:
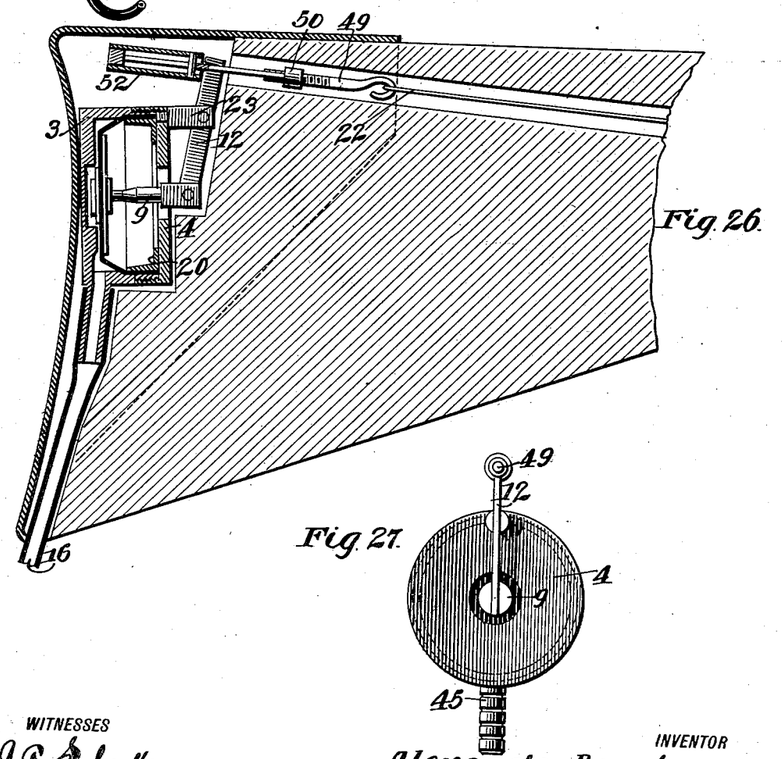
Fig. 26 is a sectional view of the invention.
Fig. 27 is a plan view thereof.

*The modification in Figs. 25, 26 and 27* is similar in many respects to the third form of the invention illustrated in Fig. 9 and constitutes the ninth form of the invention. In Fig. 26, the actuating lever 12 is fulcrumed on the bracket 23 and the free end of the lever which is equivalent to the free end of the lever shown in dotted lines in Fig. 9, is joined with the adjusting screw 49 which has a turn buckle 50 with a rearwardly extending portion to which the notched end of the lever is directly connected. The telescopically arranged handle 52 affords a ready means of making quick and convenient adjustments. The operation of the ninth form of the invention will be readily understood without further description. Air pressure under the diaphragm or piston 7 rocks the actuating lever 12 on its fulcrum with the result that the trigger bar connection 46 is actuated similarly as in the preceding seventh and eighth forms of the invention.

*The operation.*

Although it is thought that the complete operation of the two forms of the invention is fully understood from the foregoing, a brief review thereof may be to advantage. Small arms that are fired when held in the hand, are operated most effectively by using the suction principle. In this connection, attention is directed to Fig. 8 which shows a typical form of the invention.

The operator grasps the gun firmly in both hands and takes aim. In the meantime he has taken the nipple end of the hose 16 into his mouth and when the sights are on the target, he draws lightly on the nipple. The suction thus created in the vacuum cup V causes the diaphragm 7 to collapse, pulling on the stem 9, rocking the actuating lever 12, and pulling the trigger wire 22 and trigger 14 so as to release the cartridge firing mechanism. Should it be desired to temporarily remove the hose 16 so as to form no impediment to the handling of the gun, the nipple end is simply tucked into the nipple shield 31 from which it may be flipped instantly.

It has been stated that in firing the gun by the method and through the mechanism just described, the gun may be firmly grasped with both hands and by all of the fingers of both hands. In the present types of guns, after the sights are once gotten on the target, there is always a tendency to disturb the poise of the gun and consequently cause the sights to wabble on and off the target, by the muscular effort exerted through the arm and hand in pulling the trigger. This device liberates the trigger finger which is worth more in pointing than any other two fingers thus enabling the gun to be grasped more firmly by the right hand and adding greatly to the quickness and accuracy of aim. Obviously the likelihood of firing the gun accidentally is very remote.

One of the great advantages of the invention is gotten in the use of the pressure operating principles, where one operator is assigned to control an entire battery of machine guns. Such a battery may consist of one hundred or more machine guns, each being supplied with a magazine of ten thousand cartridges and furthermore arranged to be operated by the automatic fire distributer herein mentioned, which could produce a complete barrage under the control of a single operator. The last cartridge in the magazine could be loaded with nitro-glycerin and used to blow up the gun to avoid its capture when the ammunition is exhausted. Thus, one man could defend an extended front and a retreating force would be permitted to fall back with the sacrifice of but few operators.

The fifth, sixth, seventh, eighth and ninth forms of the invention illustrated in Figs. 16, 18, 19 to 21, 22 to 24, and 25 to 27 respectively, simply constitute a change in the arrangement of certain of the parts in the preceding forms of the invention and a reversal of the mode of operation. The diaphragm or piston 7 instead of being moved under the influence of suction is moved under the influence of compressed air. The coöperating lever and other necessary connections are so arranged that the various types of machine guns to which the various forms of the invention are applied, may be operated by embodying the particular style or form of the invention intended for that particular purpose.

Another important feature in all of the forms of the invention is that of the application of the firing force on the interior of the gun, with the consequent result of complete eradication of the tendency to destroy the equilibrium of the gun in firing. It will be gathered from the foregoing, that externally applied power to fire guns is wrong, as it necessarily disturbs the poise of the gun and causes the sights to wabble off the target. The pneumatic trigger pull principle herein described, is correct, because by this method the force is internally applied and is made to act equally in all directions, as will be readily perceived.

While the construction and arrangement of the pneumatically actuated trigger pull device as herein described and claimed, is that of a generally preferred form, obviously modifications and changes may be made without departing from the spirit of the invention or the scope of the claims.

I claim:—

1. A firearm containing firing mechanism with a manual trigger, and having pneumatically actuated means operatively connected with the firing mechanism and not with the trigger, to normally actuate said firing mechanism independently of the trigger, leaving said trigger unobstructed for the free application of the finger for manual operation of the firearm at times when a pneumatic impulse cannot be conveniently applied to said firing mechanism by said means.

2. Pneumatically operated means for actuating the firing mechanism of a gun independently of the manual trigger, comprising an adjustable connection operatively connected at one end to said firing mechanism, and a suction or air pressure movable diaphragm, joined to the other end of said connection, leaving the trigger free for manual operation.

3. In combination with the firing mechanism of a firearm, means operatively connected to said mechanism, for actuating it independent of finger pressure on the manual trigger of said mechanism, said means comprising a diaphragm arranged to expand or collapse by the application of compressed air or the creation of a vacuum therebeneath, connections between said diaphragm and said operating mechanism, and adjusting means embodied in said connections.

4. A firearm, comprising pneumatically operated firing mechanism, including a removable flexible mouthpiece, and means for temporarily housing said mouthpiece when not in use, said means comprising in combination, the gun stock provided with a groove and bore, an outlet elbow in the gun stock forming the attachment connection between the mouthpiece and said pneumatically operated mechanism, said mouthpiece partly occupying said groove and being adapted for insertion into the bore for protection, means for clamping the elbow down, and means for adjusting the elevation of the mouthpiece, including a movable ring.

5. In a firearm, having a finger pressure operated firing mechanism, a diaphragm, operating connections between said diaphragm and said firing mechanism including a pivoted actuating lever having a pivotal connection at one end to a carried portion of the diaphragm, means for clamping the diaphragm in position including a vacuum cup base, a top having an opening, a clamp ring with an annular groove, for housing the folds in the clamped edge of the diaphragm, and a washer between the top and ring for preventing the mutilation of the edge of the diaphragm; a hose connection leading from said base and communicating with a space beneath said diaphragm, and means for clamping said hose in place.

6. Instrumentalities enabling the controlling of the firing of an entire battery of firearms by a single operator comprising, in combination, a plurality of firearms disposed over an extended front, firing mechanism embodied in each of the firearms, air pressure operated means including a diaphragm having connections with the firing mechanism in each of the firearms, and hose connections leading from each of said air pressure operated means to a single point.

ALEXANDER BOYNTON.